United States Patent [19]
Katsube et al.

[11] Patent Number: 6,046,258
[45] Date of Patent: Apr. 4, 2000

[54] POLYESTER RESIN COMPOSITION, SWITCH MADE FROM THE SAME, AND METHOD OF PRODUCING THE SWITCH

[75] Inventors: Shunichi Katsube; Tosikazu Uemoto; Kazunori Fukuya, all of Tokyo, Japan

[73] Assignee: Mitsubishi Denki Kabushiki Kaisha, Tokyo, Japan

[21] Appl. No.: 09/068,405

[22] PCT Filed: Feb. 14, 1997

[86] PCT No.: PCT/JP97/00404

§ 371 Date: May 8, 1998

§ 102(e) Date: May 8, 1998

[87] PCT Pub. No.: WO98/36028

PCT Pub. Date: Aug. 20, 1998

[51] Int. Cl.[7] .............................. C08L 67/06; C08K 3/10; H01H 9/02
[52] U.S. Cl. ......................... 523/513; 523/514; 524/436; 524/437; 524/604; 174/58
[58] Field of Search .................................. 523/513, 514; 524/604, 436, 437; 174/58

[56] References Cited

U.S. PATENT DOCUMENTS

| | | |
|---|---|---|
| 4,619,954 | 10/1986 | Warner, II .............................. 523/514 |
| 5,153,247 | 10/1992 | Okamura et al. . | |
| 5,489,481 | 2/1996 | Hager et al. .............................. 524/604 |

FOREIGN PATENT DOCUMENTS

| | | |
|---|---|---|
| 50-129689 | 10/1975 | Japan . |
| 8-171847 | 7/1996 | Japan . |
| WO98/36028 | 8/1998 | WIPO . |

*Primary Examiner*—Tae Yoon
*Attorney, Agent, or Firm*—Burns, Doane, Swecker & Mathis, LLP

[57] ABSTRACT

A polyester resin composition comprising 21–29% by weight of a resin component consisting of fumaric acid neopentyl glycol propylene glycol type polyester and cumene hydroperoxide as a hardening agent; 52–60% by weight of one or more kinds of inorganic compounds which undergo dehydration reaction at a temperature not later than 150° C. as an inorganic filler; and 15–23% by weight of a reinforcing material. The composition of the present invention when used for an insulation component member of a switch, improves the insulation property after the cut-off of a large electric current. More specifically, the composition of the present invention can prevent the formation of the resin skin layer on the surface of the molded product, so that the inorganic compound which can be decomposed by the heat from the electric arc to produce a gas which changes the free carbon and metal vapor to nonconductive oxides can be present in the surface layer of the molded product and the insulation property can be secured even after the cut-off of the electric current.

13 Claims, 2 Drawing Sheets

POLYESTER RESIN COMPOSITION, SWITCH MADE FROM THE SAME, AND METHOD OF PRODUCING THE SWITCH

TECHNICAL FIELD

The present invention relates to a polyester resin composition which is favorably used for an insulation component of a switch an electric arc is formed from the contact thereof when an electric current is cut-off, to a switch using the polyester resin composition and to a method of producing the switch.

BACKGROUND ART

Conventionally, organic compositions comprising a thermosetting resin such as a polyester, epoxy, and phenol, a reinforcing material such as glass fiber, a filler such as calcium carbonate, and an inorganic compound such as aluminium hydroxide which is dehydrated and decomposed by heat from an electric arc, and a switch using the organic composition have been disclosed, for example, in Japanese Patent Laid-Open No. 8-171847.

In such a switch, the blended inorganic compound such as aluminium hydroxide is subjected to dehydration reaction by the heat energy from the electric arc, and $H_2O$, $O_2$ and $O$ resulting from the decomposition react with and oxidize free carbon coming from an insulation substance of the organic composition, metal vapor or metal liquid droplets coming from a metal member. $O_2$ and $O$ change the free carbon to $CO_2$ and $CO$, metal vapor to metal oxide having no conductivity, and reduce the amount of the carbon molecules, metal vapor and metal droplets, while $H_2O$ cools the electric arc and quickly cuts it off, thereby reducing the amount of the conductive carbon or metal to be adhered inside of the switch box to avoid that the insulation property lowers after the cut-off.

However, the switch produced from organic compositions disclosed in Japanese Patent Laid-Open No. 8-171847, particularly that produced from a resin composition of fumaric acid neopentyl glycol propylene glycol type polyester actually showed only a small improvement in its insulating property after an electric arc was generated.

Having analyzed a substance adhered inside of such a conventional switch, the present inventors found out that a metal layer was formed, in addition to free carbon, from scattered molten metal droplets and a sublimated metal which were generated from the contact and the metal part of the component inside of the switch when the switch was turned on or turned off and the adhered metal layer had largely affected the reduction in the insulation resistance.

As a result of detailed analysis of this phenomenon, a surface layer having a small aluminium hydroxide content and a large resin content was found on the surface of the molded insulation member comprising the conventional organic compositions. The reason for this formation is as follows: when the above-mentioned conventional organic compositions are poured into molds for molding an insulation member, the compositions in the molds are plasticized, and the resin component in the composition is contacted with the metal surface to form a skin layer. The resin component in contact with the mold is gelled and cured in a relatively short time. Therefore, the skin layer formed from the resin component is thickened and the resin components fill the most part of the surface layer of the molded product. Accordingly, the aluminium hydroxide is contained in the surface layer of the molded product only in a small amount, the expected effect cannot be obtained.

This invention has been made for solving the above-mentioned problems and its object is to provide a polyester resin composition which allows the aluminium hydroxide to be present, in a sufficient amount, in the surface layer of the molded product, so that the aluminium hydroxide oxidizes the free carbon, sublimated metal and scattered molten metal liquid droplets generated by electric arc formed by cut-off of a large current, a switch using the polyester resin composition and a process for producing the switch.

DISCLOSURE OF INVENTION

Accordingly, the present invention provides a polyester resin composition comprising 21–29% by weight of a resin component consisting of fumaric acid neopentyl glycol propylene glycol type polyester and cumene hydroperoxide as a hardening agent;

52–60% by weight of one or more kinds of inorganic compounds which undergo dehydration reaction at a temperature not lower than 150° C. as an inorganic filler; and 15–23% by weight of a reinforcing material. In the composition of the present invention, the total of the above-mentioned three components is equal to 100% by weight.

Further, the present invention provides the above-mentioned polyester resin composition comprising 23–27% by weight of a resin component consisting of fumaric acid neopentyl glycol propylene glycol type polyester and cumene hydroperoxide as a hardening agent;

52–56% by weight of one or more kinds of inorganic compounds which undergo dehydration reaction at a temperature not lower than 150° C. as an inorganic filler; and 17–21% by weight of a reinforcing material.

Furthermore, the present invention provides the above-mentioned polyester resin composition wherein the hardening agent is used in an amount of 4–8 parts by weight to 160 parts by weight of the fumaric acid neopentyl glycol propylene glycol type polyester.

Still further, the present invention provides the above-mentioned polyester resin composition wherein the reinforcing material is glass fibre and the inorganic compound is at least one kind of substance selected from the group consisting of aluminium hydroxide, calcium hydroxide and magnesium hydroxide.

Yet further, the present invention provides a switch having an insulation component member using the above-mentioned polyester resin composition.

Further, the present invention provides a method of producing an insulation component member used in the above-mentioned switch, wherein the temperature of a mold to form an external surface of the switch is made higher than that of a mold forming an internal surface of the switch.

According to the polyester resin composition of the present invention, by the use of the fumaric acid neopentyl glycol propylene glycol type polyester as the main component and cumene hydroperoxide as the hardening agent, the gel time of the resin component on the surface of the mold is prolonged when molding the polyester resin composition in molds, so that the blended inorganic compound which undergoes dehydration reaction is allowed to be present in the surface layer of the molded product to result in good generation of decomposed gas from the inorganic compound by the heat from the electric arc.

By the use of the polyester resin composition of the present invention for an insulation component member of a switch, the inorganic compound undergoes dehydration reaction by the heat from the electric arc formed by cutting-off current and $H_2O$, $O_2$ and O resulting from the decomposition react with and oxidize free carbon coming from an insulation substance, and react with and oxidize metal vapor or metal liquid droplets coming from a metal member, so that they are converted into metal oxides having no conductivity to improve the insulation property after the cut-off.

BEST MODE FOR CARRYING OUT THE INVENTION

Embodiment 1

Figure 1:
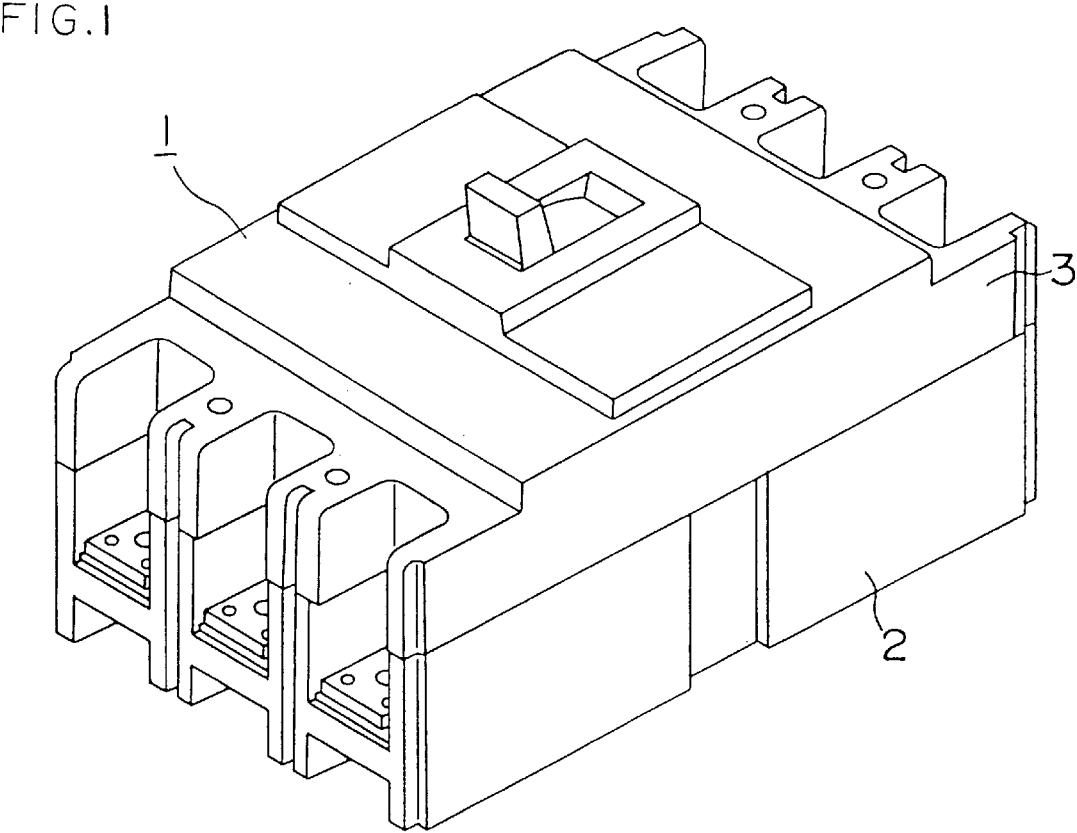
FIG. 1 is a perspective exterior view of a switch.
Figure 2:
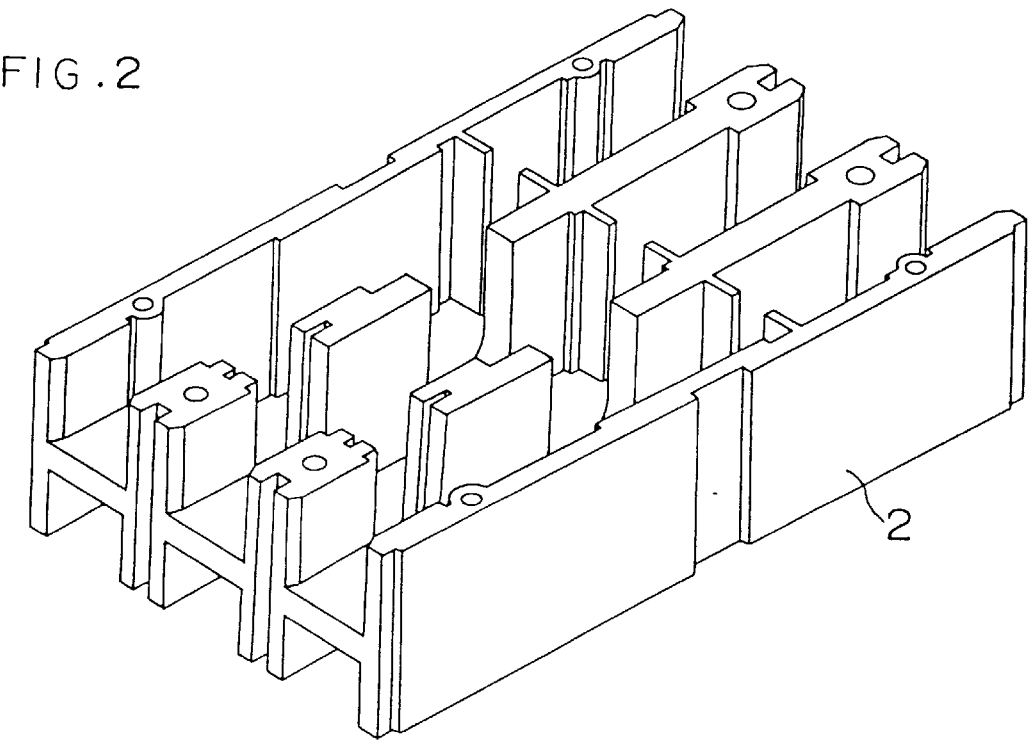
FIG. 2 is a perspective view of a base.

A perspective exterior view of a switch is presented in FIG. 1 wherein the switch 1 is provided with a base 2 which constitutes a housing of the switch 1, and a cover 3 which constitutes the housing. FIG. 2 illustrates a perspective view of the base 2.

The base 2 was prepared from polyesters having the compositions listed in Table 1.

As one exemplary composition of the present invention, an organic composition comprising 25% by weight of a polyester main resin component in which the main component was fumaric acid neopentyl glycol propylene glycol type polyester and the hardening agent was cumene hydroperoxide, 56% by weight of aluminium hydroxide as an inorganic compound, and 19% by weight of glass fiber as a reinforcing material, was subjected to compression molding and the obtained base 2 was tested.

As Comparative Example 1, a conventional organic composition containing 27% by weight of a polyester resin component, in which the main component was fumaric acid neopentyl glycol propylene glycol type polymer, the hardening agent was cyclohexanone peroxide, 54% by weight of aluminium hydroxide as an inorganic compound, and 19% by weight of glass fiber was used, and as Comparative Example 2, an organic composition containing 27% by weight of a polyester main resin component, in which the main component was fumaric acid neopentyl glycol propylene glycol type polymer, the hardening agent was cumene cyclohexanone peroxide, 54% by weight of calcium carbonate, and 19% by weight of glass fiber was used to respectively form the above-mentioned base and the obtained bases were tested for comparison. The results are shown in Table 1 in contrast with each other.

Each polyester resin component shown in Table 1 contained 160 parts by weight of the main component, 5 parts by weight of the hardening agent, and an appropriate amount of shrink resisting agent, cross-linking agent, mold releasing agent, thickener, stabilizer and the like.

Next, one exemplary procedure for preparing a composition of the present invention will be explained. Cumen hydroperoxide, a shrink resisting agent, a crosslinking agent, a mold releasing agent, a thickener, and a stabilizer were added to fumaric acid neopentyl glycol propylene glycol type polyester resin and the resin in an amount of 25% by weight was kneaded for 40 minutes with aluminium hydroxide in an amount of 56% by weight in a kneader maintained at 40° C. Then glass fibers in an amount of 19% by weight were added to said kneaded substance and further kneaded for 5 minutes. The kneaded product was taken out of the kneader and cooled at a room temperature. The cooled kneaded product was sealed in a polyethylene bag and kept in a thermostatic chamber at 20° C. for 72 hours.

Then, the base 2 of the housing of the switch shown in FIG. 2 was produced by compression molding. The molding was carried out at the mold temperature of 144° C. (top force), 148° C. (bottom force), and the pressure time of 220 seconds. The base 2 of the housing thus obtained was subjected to the following tests.

(Cut-off test)

An excess electric current of three-phase, 460 V/25 KA is passed through a closed circuit, then a movable contact is disengaged to generate an electric arc, and if the cut-off of the arc current can be successfully done, and no breakage or cracks are generated in inner parts or the housing after the cut-off, it is regarded an acceptable product.

(Insulation resistance test)

After the above-mentioned cut-off test, the insulation resistance is measured using an insulation resistance tester described in JIS C1302. The results are shown by the lowest value of the insulation resistance. The insulation resistance between terminals of different phases, and that of between the power and a load are measured.

The results in Table 1 show that, the switch housing using the molded product of the composition of the present invention had obviously good results, as it scarcely showed damages by visual observation after the cut-off, and the insulation resistance measured between terminals and loads were both good being not less than 100 MΩ.

TABLE 1

|  |  | Present Invention | Comparative Example 1 | Comparative Example 2 |
| --- | --- | --- | --- | --- |
| Composition | Resin | fumaric acid neopentyl glycol propylene glycol type polyester; cumen hydroperoxide (25 wt %) | fumaric acid neopentyl glycol propylene glycol type polyester; cyclohexanone peroxide (27 wt %) | fumaric acid neopentyl glycol propylene glycol type polyester; cyclohexanone peroxide (27 wt %) |
|  | Filler | aluminium hydroxide (56 wt %) | aluminium hydroxide (54 wt %) | calcium carbonate (54 wt %) |
|  | Reinforcement | glass fiber (19 wt %) | glass fiber (19 wt %) | glass fiber (19 wt %) |
| Insulation resistance | between the power and a load | 100 MΩ or more | 40 MΩ | 5 MΩ |
|  | between terminals | 100 MΩ or more | 15 MΩ | 0.5 MΩ |

TABLE 1-continued

|  | Present Invention | Comparative Example 1 | Comparative Example 2 |
| --- | --- | --- | --- |
| of different phases | | | |
| Cut-off test | no breakage/ cracks | no breakage/ cracks | no breakage/ cracks |

(Measurement of gel time and curing time of the material)

Figure 3:
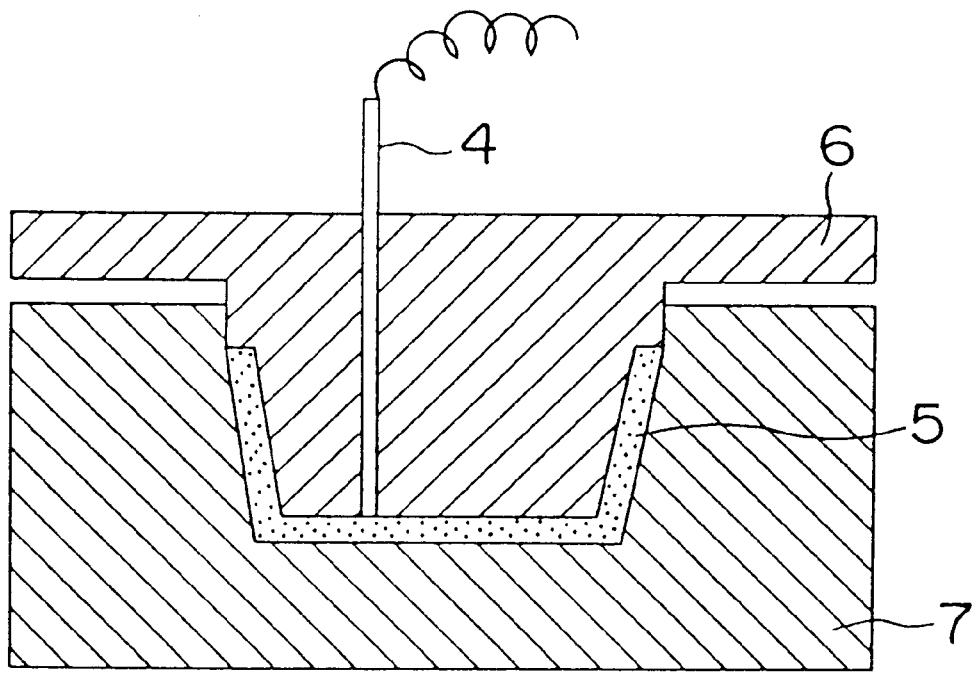
FIG. 3 is a drawing illustrating molds and conditions for measuring the gel time and the curing time of a material.

The gel time and curing time of a polyester material were measured using an automatic curing measurement apparatus (multi-channel-cure analyzer). The measurement of the gel time and curing time using the automatic curing measurement is illustrated in FIG. 3 wherein pressure sensor 4, sample 5, top force 6 and bottom force 7 are provided. About 80 g of a polyester material was put into molds comprising top force 6 and bottom force 7 shown in FIG. 3, then sample 5 was molded under molding pressure of 30 Kg/cm$^2$. The molding was carried out at the mold temperature of 130° C., 140° C., and 150° C. respectively. The results of the molding obtained by the above-mentioned automatic curing measurement apparatus are shown in Table 2.

TABLE 2

|  |  | Present Invention | Comparative Example |
| --- | --- | --- | --- |
| Composition | Resin | fumaric acid neopentyl glycol propylene glycol type polyester; cumen hydroperoxide (25 wt %) | fumaric acid neopentyl glycol propylene glycol type polyester; cyclohexanone peroxide (27 wt %) |
|  | Filler | aluminium hydroxide (56 wt %) | aluminium hydroxide (54 wt %) |
|  | Reinforcement | glass fiber (19 wt %) | glass fiber (19 wt %) |
| 130° C. | Gel time | 223 sec | 139 sec |
|  | Curing time | 269 sec | 171 sec |
| 140° C. | Gel time | 126 sec | 78 sec |
|  | Curing time | 156 sec | 104 sec |
| 150° C. | Gel time | 76 sec | 55 sec |
|  | Curing time | 102 sec | 80 sec |

Table 2 shows that since the resin component of the composition used in one embodiment of the present invention contains fumaric acid neopentyl glycol propylene glycol type polyester as the main component and cumene hydroperoxide as the hardening agent, the composition has a slow curing speed and requires the curing time which is about 1.3 times longer than that of the composition used in Comparative Example in which cyclohexanone peroxide is blended as the hardening agent, at the mold temperature of 150° C.

As the composition of Comparative Example 1 in Table 2 has a short gel time and a short curing time, the resin component in contact with the mold is gelled and cured in a relatively short time. Accordingly, a skin layer mainly containing the resin component is formed on the surface of the molded product and the major part of the surface layer of the molded product contains only the resin component.

On the other hand, the composition of the present invention in Table 2 has a long gel time and a long curing time, accordingly the resin component in the molds has a low viscosity and forms a skin layer together with the glass fiber, which is the filler, and aluminium hydroxide. Therefore, the surface layer of the resulting molded product contains a large amount of aluminium hydroxide.

Here, it is explained why the inorganic compound which is the filler in the composition of the present invention undergoes dehydration reaction at a temperature not lower than 150° C. Generally, the molding temperature for polyester is 130–150° C., so if the mixed inorganic compound undergoes pyrolysis at this molding temperature, only a reduced amount of the gas will be generated to impart insulating property when the molded product assembled in the switch is exposed to the heat from the electric arc. In order to prevent this, it is an essential requirement for the inorganic compound to carry out dehydration reaction at a temperature not lower than 150° C.

The electric arc which is formed between contacts of a switch when the contacts are disengaged each other produces free carbon from the switch housing and an organic material constituting the inside of the switch, and it also produces sublimated metal or scattered molten metal droplets from the contacts and the metal material constituting the inside of the switch, but these are converted into insulators by the insulation property imparting gas obtained by the dehydration reaction of aluminium hydroxide present in the surface layer of the housing.

That is, the electric arc at the cut-off of the current reaches to a temperature usually between 4000 and 6000° C. Accordingly, the contact and the metal material forming the inner component of the switch are heated and resulting metal vapor or molten metal liquid droplets are scattered. At this moment, not only the electric arc but also these metal vapor and the molten metal liquid droplets decompose the organic material constituting the switch housing and the components in the switch to produce free carbon as well. But, in the molded product obtained with the composition of the present invention, an insulation imparting gas is generated from aluminium hydroxide present in the surface layer, and oxidizes the free carbon and the metal vapor as well as molten metal liquid droplets to make them insulators. In this way, the amounts of the free carbon, metal vapor and the molten metal liquid droplets which have been greatly contributed to lowering the insulation resistance so far, can be decreased and the insulation resistance is prevented from being reduced, so that the lowering of the insulation after generation of the electric arc can be controlled.

While the free carbon, metal vapor or molten metal liquid droplet is converted into a non-conductor, the layer of the resulting non-conductor made from the free carbon, metal vapor or molten metal liquid droplets will not be formed on a contact, since the generated insulation imparting gas cannot approach the contact due to the high pressure vapor generated and expanded by the electric arc, accordingly the flow of the electricity after the circuit of the switch is closed again will not be disturbed.

Embodiment 2

As shown in Table 2, the mold temperature is in inverse proportion to the gel time. The composition shows a short gel time when the mold temperature is high and the surface layer of the molded product contains a little aluminium hydroxide and much resin component to provide a lustered surface. On the contrary, when the mold temperature is low, the surface layer of the molded product contains a large amount of aluminium hydroxide to provide more or less dulled luster on the surface. Accordingly, where the temperature of the mold to form the external surface of the product is raised while the temperature of the mold to form the surface inside the housing which will be exposed to the cut-off arc is lowered to carry out compression molding for providing a housing of a switch, the resulting housing of the switch can have different characteristics between the external part of the housing and the internal part with the electric insulating property of the internal part after the cut-off of the electric current being secured.

Embodiment 3

Although the composition in the above-mentioned Embodiment 1 contained aluminium hydroxide as the hydroxide compound, other metal hydroxides such as zinc borate ($2ZnO.3B_2O_3.3.5H_2O$), dawsonite ($NaAl(OH)_2CO_3$), aluminium hydroxide ($Al(OH)_3$), calcium hydroxide ($Ca(OH)_2$), calcium aluminate ($Ca_3Al_2(OH)_{12}$), magnesium hydroxide ($Mg(OH)_2$), hydrotalcite ($Mg_4Al(OH)_{12}CO_3.3H_2O$), basic magnesium carbonate ($Mg_4(CO_3)_3(OH)_2.4H_2O$), ammonium polyphosphate (($NH_4PO_3$)n) can also be used.

Since these inorganic compounds do not undergo dehydration reaction unless the temperature is 150° C. or higher, it can be contained in a thermosetting resin which is molded at the mold temperature of about 140° C. without being decomposed, and the resulting molded product can fully perform the above-mentioned functions as the arc extinguishing insulation material composition.

Among these, aluminium hydroxide, calcium hydroxide and magnesium hydroxide are preferable hydroxide compounds due to their low price and easy availability as well as non-toxic property.

For mixing with a thermosetting resin, aluminium hydroxide is particularly preferable since it gives an appropriate viscosity as a molding material.

The inorganic compound which generates the insulating property imparting gas to react with the free carbon, metal vapor and molten metal liquid droplets, can be used alone or in admixture of two or more kinds.

Embodiment 4

As a reinforcing material, in addition to the above-mentioned glass fibers, inorganic minerals, ceramic fibers and the like can also be used.

Embodiment 5

The following composition also provides an improved insulation resistance after the cut-off of the electric current.

A resin composition comprising

23–27% by weight of fumaric acid neopentyl glycol propylene glycol type polyester and cumene hydroperoxide as a hardening agent;

52–56% by weight of one or more kinds of inorganic compounds which undergo dehydration reaction at a temperature not lower than 150° C., as an inorganic filler; and 17–21% by weight of a reinforcing material.

The hardening agent is preferably used in an amount of 4–8 parts by weight, more preferably 5–7 parts by weight to 160 parts by weight of the fumaric acid neopentyl glycol propylene glycol type polyester.

Embodiment 6

In the above-mentioned Embodiment 1, the composition of the present invention was used for the housing of the switch. It is needless to say, however, the composition of the present invention can be applied for other insulation parts constituting the switch, for example, a handle, crossbar, and trip bar to exhibit the similar effects.

Industrial Applicability

The present invention constructed as described above, has the following effects.

Since the composition according to the first aspect of the present invention contains 21–29% by weight of a resin component consisting of fumaric acid neopentyl glycol propylene glycol type polyester and cumene hydroperoxide as a hardening agent; 52–60% by weight of one or more kinds of inorganic compounds which undergo dehydration reaction at a temperature not lower than 150° C. as an inorganic filler; and 15–23% by weight of a reinforcing material, the gel time of the resin composition on the mold surface during the molding process is prolonged, the mixed inorganic compound is allowed to present in the surface layer of the molded product, the generation of the gas resulting from the decomposition of the inorganic compound when it is exposed to the heat from the electric arc is improved and the free carbon, metal vapor or molten metal liquid droplets generated by the large current cut-off arc are oxidized to be non-conductors so that the insulation resistance after the cut-off of the current is secured.

As the composition according to the second aspect of the present invention contains 23–27% by weight of a resin component comprising fumaric acid neopentyl glycol propylene glycol type polyester and cumene hydroperoxide as a hardening agent; 52–56% by weight of one or more inorganic compounds which undergo dehydration reaction at a temperature not lower than 150° C. as an inorganic filler; and 17–21% by weight of a reinforcing material, the insulating resistance after the cut-off of the current is further improved.

As the composition according to the third aspect of the present invention contains 4–8 parts by weight of the hardening agent for 160 parts by weight of the fumaric acid neopentyl glycol propylene glycol type polyester, the insulation resistance after the cut-off of the current is further improved.

As the composition according to the fourth aspect of the present invention contains glass fiber as the reinforcing material, and one or more compounds selected from the group consisting of aluminium hydroxide, calcium hydroxide and magnesium hydroxide as the inorganic compound, it can provide a non-toxic, easily available and inexpensive insulation component member.

Since the above-mentioned composition of the present invention is used for an insulation component member of a switch, and the molding of the insulation component member is carried out such that the mold temperature to form the external surface of the switch is made higher than the mold temperature to form the inner surface of the switch, the switch of the present invention can contain an inorganic compound such as aluminium hydroxide in the surface layer of the inner surface thereof subjected to the electric arc, so that the insulation after the cut-off of the current is secured and the external surface of the switch which is not subjected to the electric arc can be made lustrous.

What is claimed is:

1. A polyester resin composition comprising
   - 21–29% by weight of a resin component consisting of fumaric acid neopentyl glycol propylene glycol polyester and cumene hydroperoxide as a hardening agent;
   - 52–60% by weight of one or more inorganic compounds which undergo dehydration reaction at a temperature not lower than 150° C. as an inorganic filler; and
   - 15–23% by weight of a reinforcing material.

2. The polyester resin composition according to claim 1, comprising
   - 23–27% by weight of a resin component consisting of fumaric acid neopentyl glycol propylene glycol polyester and cumene hydroperoxide as a hardening agent;
   - 52–56% by weight of one or more inorganic compounds which undergo dehydration reaction at a temperature not lower than 150° C., as an inorganic filler; and
   - 17–21% by weight of a reinforcing material.

3. The polyester resin composition according to claim 1, wherein the hardening agent is used in an amount of 4–8 parts by weight to 160 parts by weight of the fumaric acid neopentyl glycol propylene glycol polyester.

4. The polyester resin composition according to claim 1, wherein the reinforcing material is glass fiber and the inorganic compound is at least one substance selected from the group consisting of aluminum hydroxide, calcium hydroxide and magnesium hydroxide.

5. A switch having an insulation component member using the polyester resin composition according to claim 1.

6. A method of producing an insulation component member of the switch according to claim 5 comprising the step of
   making the temperature of a mold to form an external surface of the switch higher than the temperature of a mold forming the internal surface of the switch.

7. A switch comprising an insulation component member, which member comprises the polyester resin composition according to claim 2.

8. A switch comprising an insulation component member, which member comprises the polyester resin composition according to claim 3.

9. A switch comprising an insulation component member, which member comprises the polyester resin composition according to claim 4.

10. The switch according to claim 5, wherein the insulation component member is a housing.

11. The switch according to claim 5, wherein the insulation component member is a base.

12. The switch according to claim 5, wherein the insulation component member is a crossbar.

13. The switch according to claim 12, wherein a temperature of the mold is 150° C. or less.

* * * * *